(12) United States Patent  (10) Patent No.: US 8,571,123 B2
Kwon et al.  (45) Date of Patent: Oct. 29, 2013

(54) APPARATUS AND METHOD FOR MAPPING SYMBOL

(75) Inventors: DongSeung Kwon, Daejeon (KR); Byung-Jae Kwak, Seoul (KR); Choongil Yeh, Daejeon (KR); Young Seog Song, Daejeon (KR); Seung Joon Lee, Daejeon (KR); Jihyung Kim, Daejeon (KR); Wooram Shin, Daejeon (KR); Bum-Soo Park, Daejeon (KR); Chung Gu Kang, Seoul (KR); Jin-Woo Kim, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 389 days.

(21) Appl. No.: 12/995,597

(22) PCT Filed: Jun. 4, 2009

(86) PCT No.: PCT/KR2009/002971
 § 371 (c)(1),
 (2), (4) Date: Dec. 1, 2010

(87) PCT Pub. No.: WO2009/148272
 PCT Pub. Date: Dec. 10, 2009

(65) Prior Publication Data
 US 2011/0142163 A1    Jun. 16, 2011

(30) Foreign Application Priority Data

Jun. 5, 2008  (KR) .................. 10-2008-0052952
 May 20, 2009  (KR) .................. 10-2009-0044070

(51) Int. Cl.
 *H04L 27/34* (2006.01)
 *H04L 27/36* (2006.01)
 *H04L 1/14* (2006.01)
 *H03M 13/00* (2006.01)

(52) U.S. Cl.
 USPC ............ 375/261; 375/298; 714/748; 714/759

(58) Field of Classification Search
 USPC .......... 375/241, 242, 261, 265, 298; 341/143; 714/748, 749, 759, 760
 See application file for complete search history.

(56) References Cited

U.S. PATENT DOCUMENTS

| 5,473,621 | A  | * | 12/1995 | Wei ............................... 714/784 |
| 5,706,312 | A  | * | 1/1998  | Wei ............................... 375/298 |
| 7,154,961 | B2 | * | 12/2006 | Wengerter et al. ............ 375/267 |
| 7,280,606 | B2 |   | 10/2007 | Kim et al. |
| 2003/0072292 | A1 |   | 4/2003 | Yoon et al. |
| 2003/0110436 | A1 | * | 6/2003 | Golitschek Edler Von Elbwart et al. .................. 714/748 |
| 2004/0081073 | A1 |   | 4/2004 | Walton et al. |

(Continued)

FOREIGN PATENT DOCUMENTS

| EP | 1 189 380 A2 | 3/2002 |
| EP | 1 619 801 A1 | 1/2006 |
| KR | 10-2003-0032381 A | 4/2003 |
| KR | 10-2003-0035028 A | 5/2003 |

*Primary Examiner* — Young T. Tse
(74) *Attorney, Agent, or Firm* — Jefferson IP Law, LLP

(57) ABSTRACT

In a symbol mapping method, transmission data is encoded to output information bits and redundancy bits. The information bits and the redundancy bits are mapped to a symbol according to a first mapping scheme at a first transmission, and the information bits and the redundancy bits are mapped to a symbol according to a second mapping scheme at a second transmission.

7 Claims, 5 Drawing Sheets

(56) References Cited

U.S. PATENT DOCUMENTS

| | | |
|---|---|---|
| 2005/0193307 A1 | 9/2005 | Wengerter et al. |
| 2008/0056202 A1 | 3/2008 | Kim et al. |
| 2008/0260067 A1* | 10/2008 | Wengerter et al. ............ 375/298 |
| 2009/0028129 A1* | 1/2009 | Pi et al. ......................... 370/351 |
| 2009/0086849 A1* | 4/2009 | Tsai et al. ...................... 375/298 |
| 2009/0300456 A1* | 12/2009 | Pelletier et al. ............... 714/749 |

* cited by examiner

[Fig. 7]
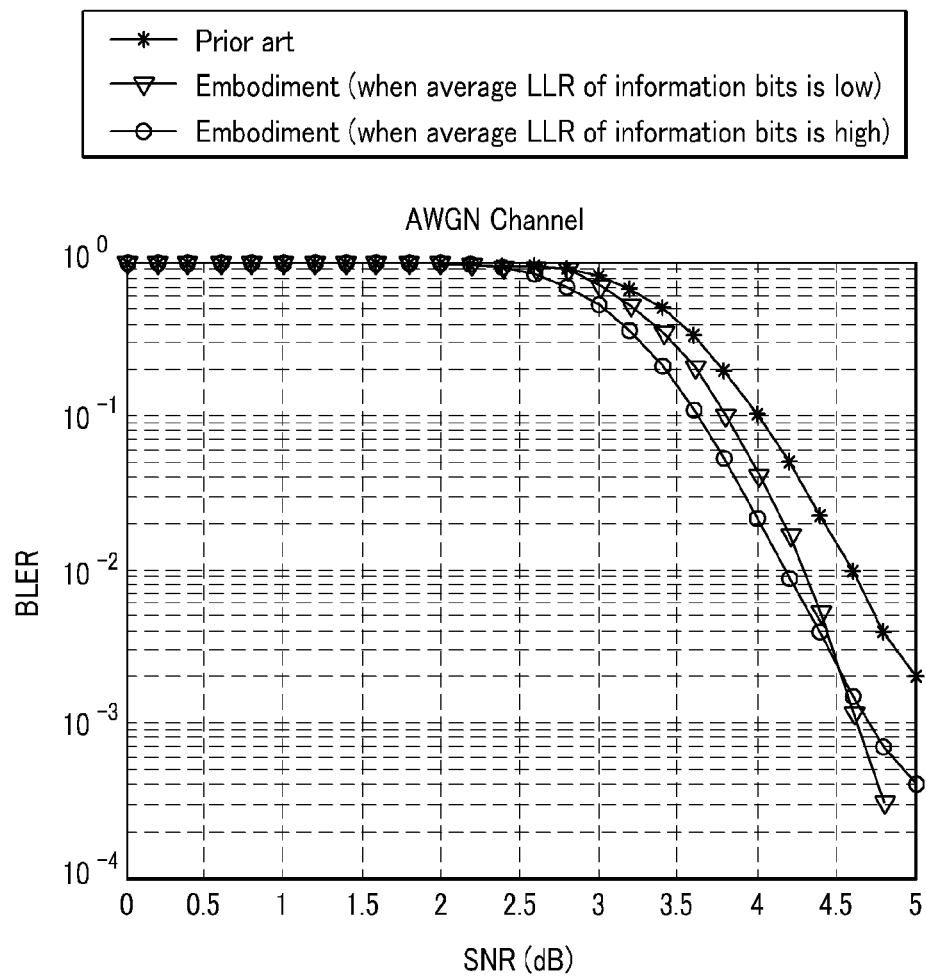

APPARATUS AND METHOD FOR MAPPING SYMBOL

TECHNICAL FIELD

The present invention relates to a symbol mapping method and apparatus.

BACKGROUND ART

When information bits are encoded by a systematic channel coder, redundancy bits are added to the information bits. An example of the systematic encoder is a convolutional turbo code (CTC).

Quadrature amplitude modulation (QAM) from among the modulation methods converts a plurality of bits of transmission data into phase and amplitude information of a symbol and transmits the same. 16-QAM can transmit 4 bits with a symbol, and 64-QAM can transmit 6 bits with a symbol.

The 16-QAM is a method for dividing the data to be transmitted into 4-bit units, mapping each of the units to one of 16 symbols, modulating them, and transmitting them, and it generally uses the gray mapping for the symbol mapping method. When the 4-bit symbol that is modulated by the gray mapping is received, the bits of the received symbol respectively have different reliability. For example, the reliability of the received bits can be shown as log likelihood ratio (LLR) values.

Since the related art maps the symbol without distinguishing reliability differences, information bits, and redundancy bits, a block error rate (BLER) is high.

In addition, a wireless communication system uses a retransmission scheme to improve the performance. According to retransmission scheme, when a receiver fails to receive a packet correctly, the packet is retransmitted. A hybrid automatic retransmit request (HARQ) scheme is one example of the retransmission scheme. In the retransmission scheme, the reliability of the bits may be an important factor to reduce the BLER of the packet.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

Aspects of the present invention provide a symbol mapping method and apparatus for reducing the BLER.

Technical Solution

One aspect of the present invention provides a method of mapping transmission data to a symbol in a symbol mapping apparatus. The method includes encoding the transmission data to output a plurality of information bits and a plurality of redundancy bits, mapping the information bits and the redundancy bits to a symbol according to a first mapping scheme at a first transmission, and mapping the information bits and the redundancy bits to a symbol according to a second mapping scheme at a second transmission. The second mapping scheme may be different from the first mapping scheme.

Another aspect of the present invention provides a symbol mapping apparatus including a channel coder and a symbol mapper. The channel coder encodes transmission data to output a plurality of information bits and a plurality of redundancy bits. The symbol mapper maps the information bits and the redundancy bits to a symbol according to a first mapping scheme at a first transmission, and maps the information bits and the redundancy bits to a symbol according to a second mapping scheme at a second transmission. The second mapping scheme may be different from the first mapping scheme.

Yet another aspect of the present invention provides a method of mapping transmission data to a symbol in a symbol mapping apparatus. The method includes encoding the transmission data to output a plurality of information bits and a plurality of redundancy bits, mapping the information bits and the redundancy bits to a symbol according to a first mapping scheme at an initial transmission, transmits a packet including the symbol mapped according to the first mapping scheme, mapping the information bits and the redundancy bits to a symbol according to a second mapping scheme, and retransmits a packet including the symbol mapped according to the second mapping scheme. The second mapping scheme may be different from the first mapping scheme,

BRIEF DESCRIPTION OF DRAWINGS

FIG. 7 shows performance of a symbol mapping method according to an embodiment of the present invention.

MODE FOR THE INVENTION

In the following detailed description, only certain embodiments of the present invention have been shown and described, simply by way of illustration. As those skilled in the art would realize, the described embodiments may be modified in various different ways, all without departing from the spirit or scope of the present invention. To clarify the present invention, parts that are not related to description are omitted, and the same parts have the same drawing sequences through the entire specification.

In the specification, unless explicitly described to the contrary, the word "comprise" and variations such as "comprises" or "comprising" will be understood to imply the inclusion of stated elements but not the exclusion of any other elements. In addition, the terms "-er" described in the specification mean units for processing at least one function and operation and can be implemented by hardware components or software components and combinations thereof.

The reliability of respective bits in the symbol when modulating the transmission data will now be described with reference to FIG. 1 and FIG. 2.

Figure 1:
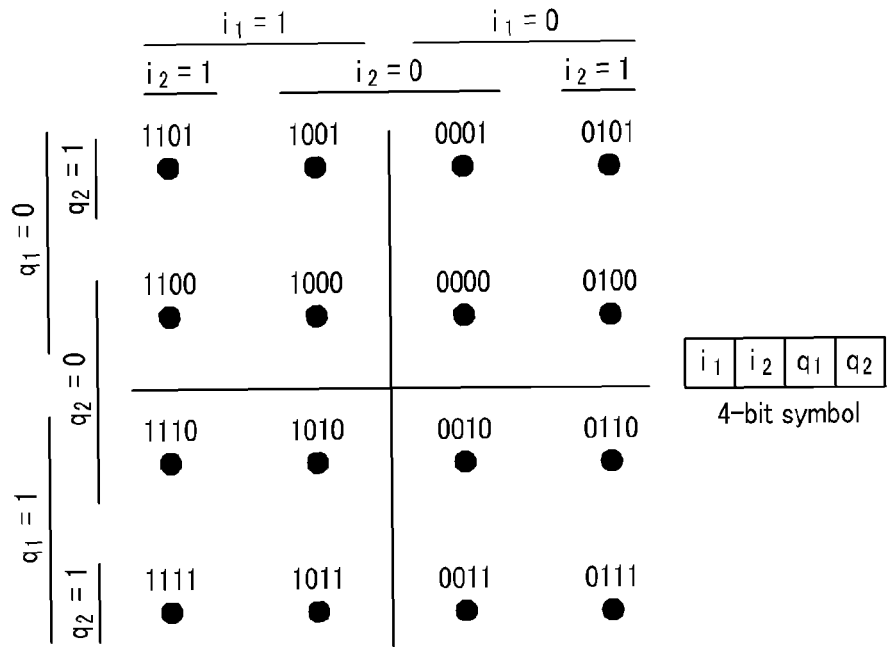
FIG. 1 and FIG. 2 respectively show examples of 16-QAM gray mapping.
Figure 2:
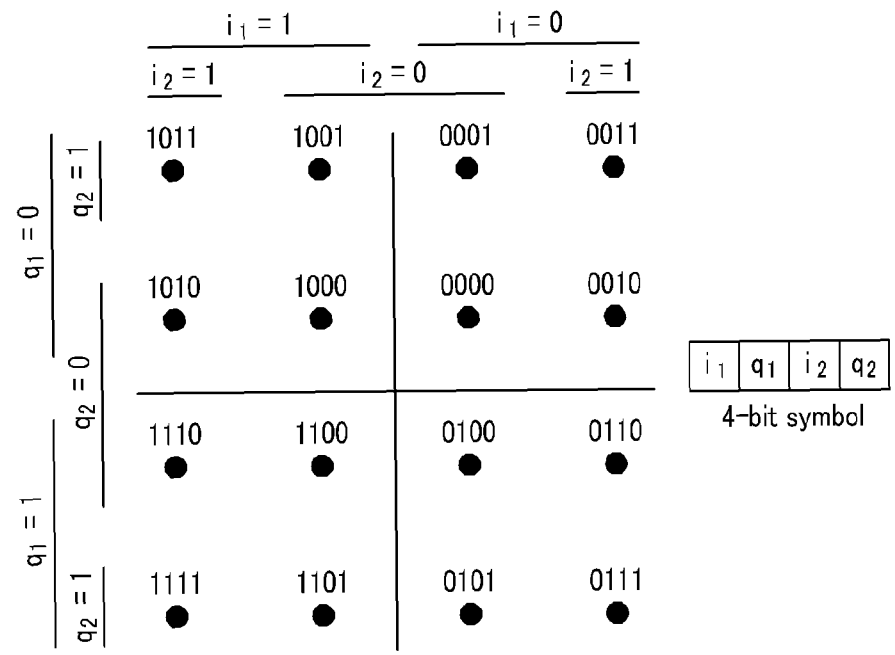

FIG. 1 shows an example of 16-QAM gray mapping, and FIG. 2 shows another example of 16-QAM gray mapping. FIG. 1 and FIG. 2 will use 16-QAM as an example of modulation, gray mapping as an example of symbol mapping, and LLR as an example of reliability.

Referring to FIG. 1 and FIG. 2, in the gray mapping, 1 bit value is different between adjacent symbols and other bit values are the same. A plurality of gray mappings may be provided for one 16-QAM constellation, and FIG. 1 and FIG. 2 show two different gray mappings for one QAM constellation. That is, the 4 bits are provided in the order of $i_1$, $i_2$, $q_1$, and $q_2$ in the symbol of FIG. 1, and the 4 bits are provided in the order of $i_1$, $q_1$, $i_2$, and $q_2$ in the symbol of FIG. 2.

Table 1 shows the average LLR of the first bit ($i_1$) and the average LLR of the second bit ($i_2$) from among the bits mapped as in-phase components of the QAM symbol by gray mapping shown in FIG. 1.

TABLE 1

| Symbol ($i_1 i_2 q_1 q_2$) | Average of x | LLR of $i_1$ | LLR of $i_2$ |
|---|---|---|---|
| $00 q_1 q_2$ | $x_0$ | $-4K x_0^2 = -\Lambda$ | $-4K x_0^2 = -\Lambda$ |
| $01 q_1 q_2$ | $x_1$ | $-12K x_0^2 = -3\Lambda$ | $4K x_0^2 = \Lambda$ |
| $10 q_1 q_2$ | $-x_0$ | $4K x_0^2 = \Lambda$ | $-4K x_0^2 = -\Lambda$ |
| $11 q_1 q_2$ | $-x_1$ | $12K x_0^2 = 3\Lambda$ | $4K x_0^2 = \Lambda$ |

Here, x is a coordinate of the x axis (i.e., horizontal axis) of the received symbol, $-x_1$, $-x_0$, $x_0$, and $x_1$ represent coordinates of four x's in the direction from the left to the right in FIG. 1, the average of x is provided assuming that received noise is white noise with the average 0, and K is a constant.

In Table 1, it can be known that the average LLR value of the first bit $i_1$ from among the bits mapped as in-phase components is substantially twice the average LLR value of the second bit $i_2$. In a like manner, the average LLR value of the first bit $q_1$ from among the bits mapped as quadrature components is substantially twice the average LLR value of the second bit $q_2$. Therefore, the average LLR value (i.e., reliability) of the respective bits of 16-QAM are variable by their locations.

In the case of 64-QAM, in a like manner of 16-QAM, the average LLR value of a plurality of bits in the QAM symbol may be changeable according to the location.

A symbol mapping method according to an embodiment of the present invention will now be described with reference to FIG. 3 to 7.

Figure 3:
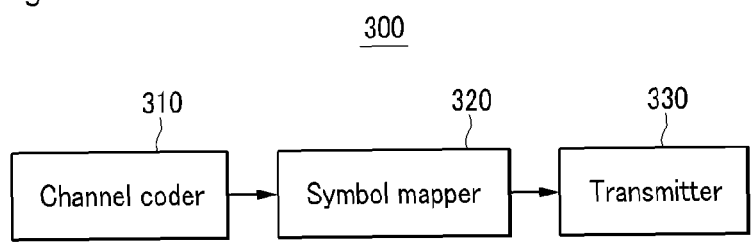
FIG. 3 shows a block diagram of a symbol mapping apparatus according to an embodiment of the present invention.
Figure 4:
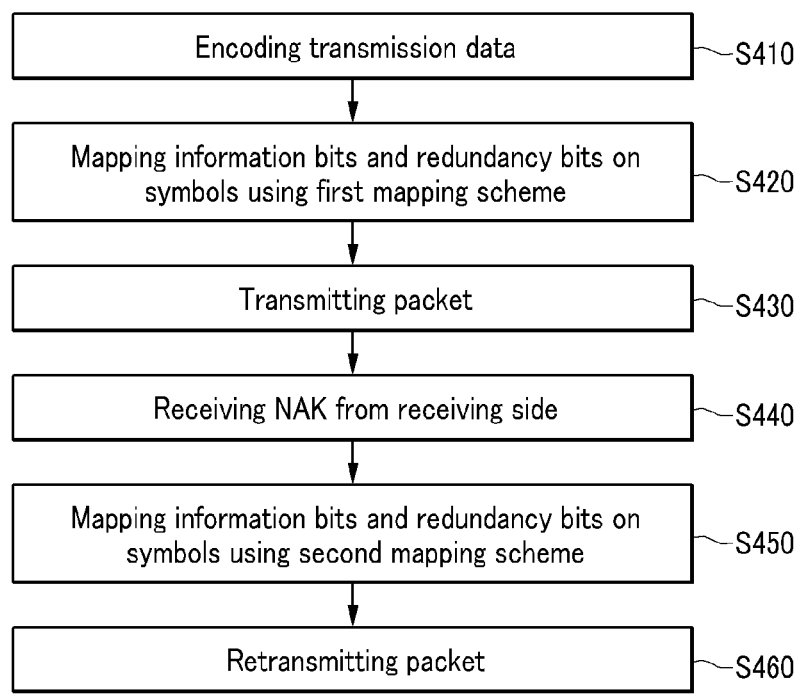
FIG. 4 shows a flowchart of a symbol mapping method according to an embodiment of the present invention.

FIG. 3 shows a block diagram of a symbol mapping apparatus according to an embodiment of the present invention, and FIG. 4 shows a flowchart of a symbol mapping method according to an embodiment of the present invention.

Referring to FIG. 3, a symbol mapping apparatus 300 according to an embodiment of the present invention includes a channel coder 310, a symbol mapper 320, and a transmitter 330.

Referring to FIG. 4, the channel coder 310, for example a systematic channel coder, encodes transmission data (S410). The channel coder 310 outputs data in which a plurality of redundancy bits are added to a plurality of information bits. The information bits are bits corresponding to the transmission data, and the redundancy bits are bits including redundancy information for the transmission data. The symbol mapper 320 maps the information bits and the redundancy bits to symbols according to a first mapping scheme (S420). The transmitter 330 transmits a packet including the symbols to a receiving side (S430). Before the symbol mapper 320 maps the information bits and the redundancy bits to the symbols, the information bits and/or the redundancy bits may be punctured, and the information bits and/or the redundancy bits may be interleaved.

The receiving side transmits a negative acknowledge (NAK) to the symbol mapping apparatus 300 when the receiving side fails to receive the packet correctly after the initial transmission of the step S430 (S440). In this case, the symbol mapper 320 maps the information bits and the redundancy bits to symbols according to a second mapping scheme that is different from the first mapping scheme (S450), and then, the transmitter 330 retransmits a packet including the symbols to the receiving side (S460). An HARQ scheme may be used as the retransmission scheme.

As such, the second mapping scheme is set to be different from the first mapping scheme such that bits which have been mapped to bits having low reliability at the initial transmission can be mapped to bits having high reliability at the retransmission. As a result, a BLER of the receiving side can be reduced.

Figure 5:
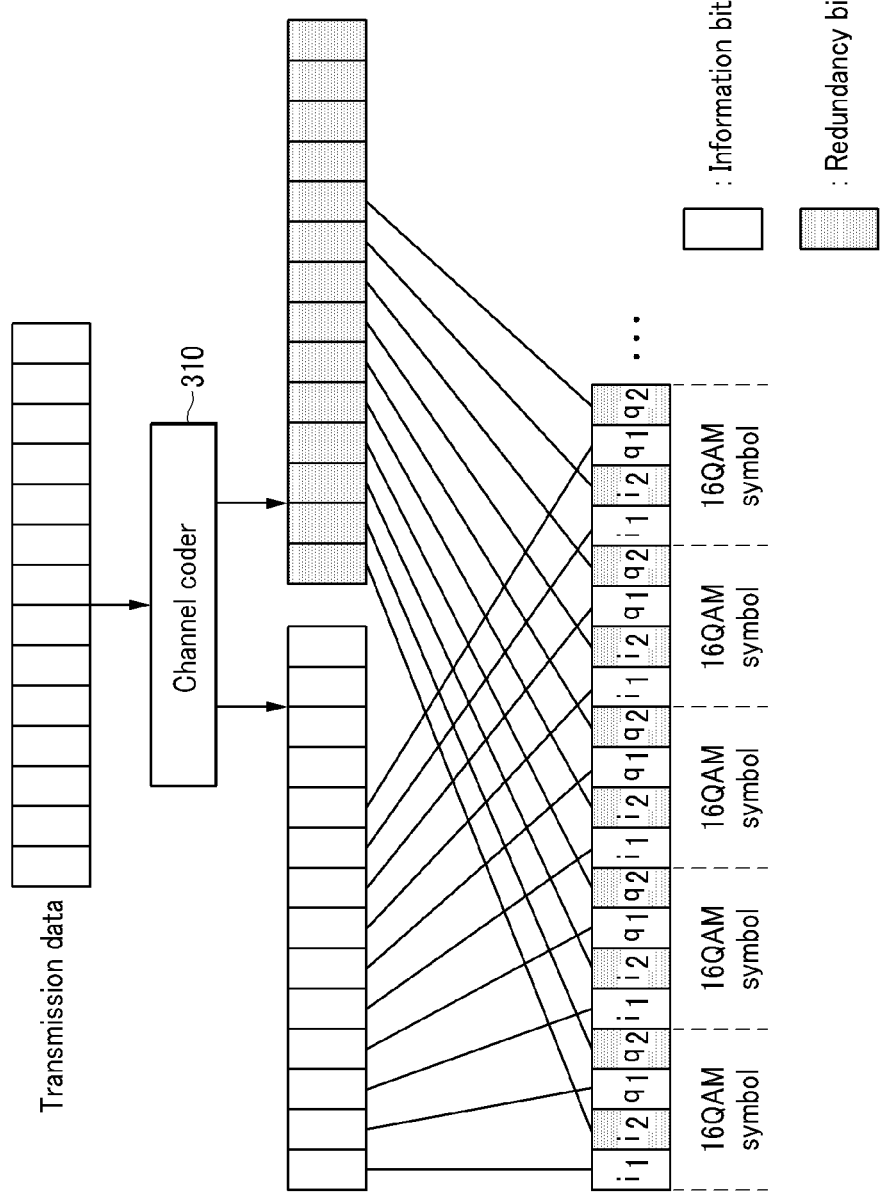
FIG. 5 and FIG. 6 respectively show an example of mapping scheme according to an embodiment of the present invention.
Figure 6:
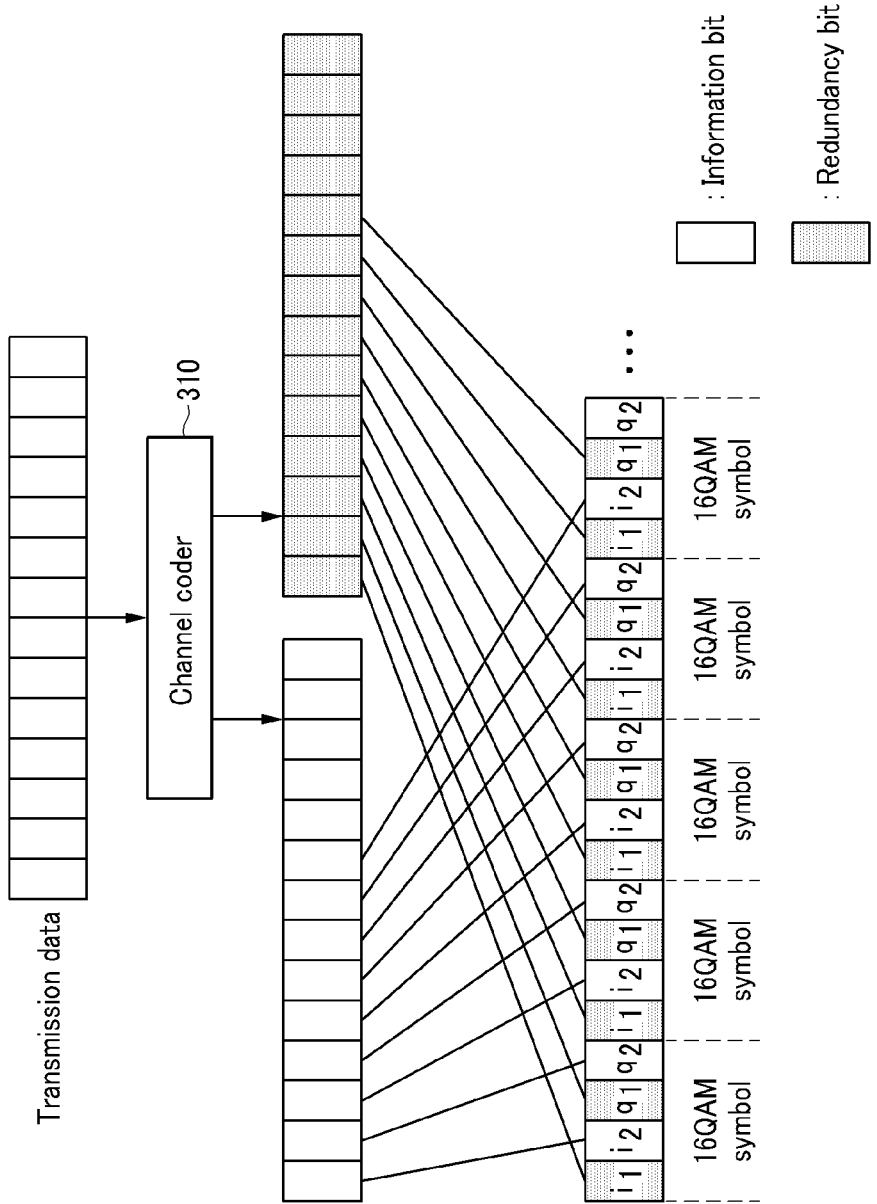

FIG. 5 and FIG. 6 respectively show an example of mapping scheme according to an embodiment of the present invention. It is assumed that the 16-QAM gray mapping shown in FIG. 1 is used in FIG. 5 and FIG. 6.

Referring to FIG. 5, the symbol mapper 320 maps the information bits to bits $i_1$ and $q_1$ of 16-QAM symbols, and it maps the redundancy bits to bits $i_2$ and $q_2$ of 16-QAM symbols. Accordingly, the symbol mapper 320 maps the information bits to the bits $i_1$ and $q_1$ with the large average LLR value, i.e., the high reliability and the redundancy bits to the bits $i_2$ and $q_2$ with the small average LLR value, i.e., the low reliability to thus increase reliability of the information bits to be higher than that of the redundancy bits.

Referring to FIG. 6, differently from FIG. 5, the symbol mapper 320 maps the redundancy bits to bits $i_1$ and $q_1$ of 16-QAM symbols, and it maps the information bits to bits $i_2$ and $q_2$ of 16-QAM symbols. Accordingly, the symbol mapper 320 maps the redundancy bits to the bits $i_1$ and $q_1$ with the large average LLR value, i.e., the high reliability and the information bits to the bits $i_2$ and $q_2$ with the small average LLR value, i.e., the low reliability to thus increase reliability of the redundancy bits to be higher than that of the information bits.

FIG. 7 shows performance of a symbol mapping method according to an embodiment of the present invention.

FIG. 7 shows a BLER with respect to a signal-to-noise ratio (SNR) in an additive white Gaussian noise (AWGN) channel in the case of using the convolutional turbo code with the encoding rate of ⅓ in the 16-QAM orthogonal frequency division multiplexing (OFDM) system.

As shown in FIG. 7, the BLER in the case of setting the information bits to be greater than the average LLR value of the redundancy bits or setting mapping the average LLR value of the information bits to be less than the average LLR value of the redundancy bits in a like manner of the symbol mapping method according to the embodiment of the present invention is shown to be less than the BLER according to the symbol mapping method considering no LLR value. That is, the BLER of the symbol mapping method according to the embodiment of the present invention is better than that of the prior art.

As such, the symbol mapper 320 maps the information bits and the redundancy bits to the symbols according to the mapping scheme shown in FIG. 5 or FIG. 6 such that the BLER can be reduced.

In addition, since the symbol mapper 320 uses the mapping scheme shown in FIG. 6 at the retransmission when the mapping scheme shown in FIG. 5 is used at the initial transmission or uses the mapping scheme shown in FIG. 5 at the retransmission when the mapping scheme shown in FIG. 6 is used at the initial transmission, the bits which have been transmitted through the bits with the low reliability at the initial transmission can be transmitted through the bits with high reliability at the retransmission. As a result, the initial transmission packet and the retransmission packet complement each other such that both diversity gain and coding gain can be obtained and the BLER can be reduced.

While the 16-QAM having four bits ($i_1$, $q_1$, $i_2$, $q_2$) for each symbol has been described in the embodiment of the present invention, the symbol mapping method according to the embodiment of the present invention may be applicable to other modulation as well as the 16-QAM.

For example, a $2^{2n}$-QAM has 2n bits ($i_1, i_2, \ldots, i_n, q_1, q_2, \ldots, q_n$) for each symbol, and the LLR values of the respective bits are different. In this case, as described with reference to FIG. 5 and FIG. 6, the symbol mapper 320 may map the information bits to the bits with the relatively greater LLR value from among the 2n bits, and map the redundancy bits to the bits with the relatively less LLR value. Alternatively, the symbol mapper 320 may map the information bits to the bits with the relatively less LLR value from among the 2n bits, and map the redundancy bits to the bits with the relatively greater LLR value.

The above-described embodiments can be realized through a program for realizing functions corresponding to the configuration of the embodiments or a recording medium for recording the program in addition to through the above-described apparatus and/or method, which is easily realized by a person skilled in the art.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of mapping transmission data to a symbol in a symbol mapping apparatus, the method comprising:
    encoding the transmission data to output a plurality of information bits and a plurality of redundancy bits;
    mapping the information bits and the redundancy bits to symbols according to a first mapping scheme at a first transmission; and
    mapping the information bits and the redundancy bits to the symbols according to a second mapping scheme at a second transmission, the second mapping scheme being different from the first mapping scheme,
    wherein mapping the information bits and the redundancy bits to the symbols according to the first mapping scheme comprises:
        mapping the information bits to first bits of the symbols; and
        mapping the redundancy bits to second bits of the symbols,
    wherein mapping the information bits and the redundancy bits to the symbols according to the second mapping scheme comprises:
        mapping the information bits to the second bits of the symbols; and
        mapping the redundancy bits to the first bits of the symbols, and
    wherein the positional reliability of the first bits is higher than that of the second bits or the positional reliability of the first bits is lower than that of the second bits.

2. The method of claim 1, wherein the positional reliability is higher as an average log likelihood ratio (LLR) value for position is increased.

3. The method of claim 1, wherein the second transmission is performed by a hybrid automatic retransmit request (HARQ) scheme.

4. A symbol mapping apparatus comprising:
    a channel coder that encodes transmission data to output a plurality of information bits and a plurality of redundancy bits; and
    a symbol mapper that maps the information bits and the redundancy bits to symbols according to a first mapping scheme at a first transmission, and maps the information bits and the redundancy bits to the symbols according to a second mapping scheme at a second transmission, the second mapping scheme being different from the first mapping scheme,
    wherein the information bits are mapped to first bits of the symbols and the redundancy bits are mapped to second bits of the symbols at the first transmission,
    wherein the information bits are mapped to the second bits of the symbols and the redundancy bits are mapped to the first bits of the symbols at the second transmission, and
    wherein the positional reliability of the first bits is higher than that of the second bits or the positional reliability of the first bits is lower than that of the second bits.

5. The symbol mapping apparatus of claim 4, wherein the positional reliability is higher as an average log likelihood ratio (LLR) value is increased.

6. The symbol mapping apparatus of claim 4, wherein the second transmission is performed by a hybrid automatic retransmit request (HARQ) scheme.

7. A method of mapping transmission data to a symbol in a symbol mapping apparatus, the method comprising:
    encoding the transmission data to output a plurality of information bits and a plurality of redundancy bits;
    mapping the information bits and the redundancy bits to symbols according to a first mapping scheme at an initial transmission;
    transmits a packet including the symbols mapped according to the first mapping scheme;
    mapping the information bits and the redundancy bits to the symbols according to a second mapping scheme, the second mapping scheme being different from the first mapping scheme; and
    retransmits a packet including the symbols mapped according to the second mapping scheme,
    wherein the information bits are mapped to first bits of the symbols and the redundancy bits are mapped to second bits of the symbols at the initial transmission,
    wherein the information bits are mapped to the second bits of the symbols and the redundancy bits are mapped to the first bits of the symbols at the retransmission, and
    wherein the positional reliability of the first bits is higher than that of the second bits or the positional reliability of the first bits is lower than that of the second bits.

* * * * *